United States Patent
H'Mimy et al.

(10) Patent No.: US 6,240,275 B1
(45) Date of Patent: May 29, 2001

(54) SYSTEM AND METHOD FOR CHANNEL ASSIGNMENT BASED UPON INTERFERENCE AND CHANNEL QUALITY MEASUREMENTS

(75) Inventors: Hossam H. H'Mimy, Plano; Ali R. Shah, Dallas, both of TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/224,069

(22) Filed: Dec. 30, 1998

(51) Int. Cl.[7] ................................................. H04B 17/00
(52) U.S. Cl. .......................... 455/62; 455/450; 455/512; 455/513; 370/332; 370/333
(58) Field of Search ............................. 455/62, 513, 450, 455/451, 452, 509, 512, 514, 436; 370/329, 332, 333

(56) References Cited

U.S. PATENT DOCUMENTS 5,448,750 * 9/1995 Eriksson et al. ..................... 455/33.1
6,023,623 * 2/2000 Benkner et al. ..................... 455/452

* cited by examiner

*Primary Examiner*—Lee Nguyen
(74) *Attorney, Agent, or Firm*—Jenkens & Gilchrist, P.C.

(57) ABSTRACT

A telecommunications system and method is disclosed for assigning channels based upon interference and channel quality measurements. The interference level measurements are carried out on the uplink of the cellular network. Channels are categorized in accordance with interference bands depending upon the interference levels. Incoming service is pre-assigned to a channel in the highest available interference band and a channel quality measurement (CQM) is conducted. The service is either continued (assigned) on the same channel, reassigned to a channel with lower interference or dropped if no other channel with lower interference is available based upon the channel quality measurement and the interference bands having available channels.

18 Claims, 3 Drawing Sheets

SYSTEM AND METHOD FOR CHANNEL ASSIGNMENT BASED UPON INTERFERENCE AND CHANNEL QUALITY MEASUREMENTS

BACKGROUND OF THE PRESENT INVENTION

1. Field of the Invention

The present invention relates generally to telecommunications systems and methods for providing speech quality to mobile stations within a cellular network, and specifically to assigning channels to mobile stations based upon uplink interference levels and channel quality.

2. Background and Objects of the Present Invention

Mobile communications, especially cellular radio, is one of the fastest growing and most demanding telecommunications applications ever. Today it accommodates a large and continuously increasing percentage of all new telephone subscriptions around the world with the increasing service requirements. Cellular networks have evolved into two different networks within Time Division Multiple Access (TDMA) technology. The European cellular network uses the Global System for Mobile Communication (GSM) standard as the digital cellular system. In the United States, cellular networks have traditionally been primarily analog, but recent advances have been incorporating digital systems within the analog networks. One such North American cellular network is the D-AMPS network, which is described hereinbelow.

With reference now to FIG. 1 of the drawings, there is illustrated a D-AMPS Public Land Mobile Network (PLMN), such as cellular network 10, which in turn is composed of a plurality of areas 12, each with a Mobile Services Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) 20 may move freely without having to send update location information to the MSC/VLR area 12 that controls the LA 18.

Each Location Area 12 is divided into a number of cells 22. Mobile Station (MS) 20 is the physical equipment, e.g., a car phone or other portable terminal, such as a laptop, used by mobile subscribers to communicate with the cellular network 10, each other, and users outside the subscribed network, both wireline and wireless. The MSC 14 is in communication with a Base Station (BS) 24. The BS 24 is the physical equipment, illustrated for simplicity as a radio tower, that provides radio coverage to the geographical part of the cell 22 for which it is responsible.

With further reference to FIG. 1, the PLMN Service Area or cellular network 10 includes a Home Location Register (HLR) 26, which is a database maintaining all subscriber information, e.g., user profiles, current location information, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If a MS 20 roams into a new MSC/VLR area 12, the VLR 16 connected to that MSC 14 will request data about that Mobile Station 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

The radio interface between the BS 24 and the MS 20 can utilize, for example, Frequency Division Multiple Access (FDMA) or Time Division Multiple Access (TDMA) to transmit information between the BS 24 and the MS 20. In TDMA, as shown in FIG. 1 of the drawings, one TDMA frame 24 is assigned per carrier frequency. Each frame 24 consists of six timeslots or physical channels 35. Depending upon the kind of information sent, different types of logical channels can be mapped onto the physical channels 35. For example, speech is sent on the logical channel, "Traffic Channel" (TCH) 37, and signaling information is sent on the logical channel, "Control Channel" (CCH) 38.

Currently, speech and data are transmitted from the BS 24 to the MS 20 on a downlink channel 30 and from the MS 20 to the BS 24 on an uplink channel 32. Interference on either the downlink channel 30 or uplink channel 32 can significantly reduce the quality of the signal transmitted on these channels. Two types of interference of interest are co-channel interference and adjacent channel interference. Co-channel interference is the interference caused by the usage of the same frequency within two different clusters (not shown) of cells 22. Adjacent channel interference is caused by the usage of adjacent frequencies between adjacent cells 22 within the same cluster or within two different clusters.

In analog systems, the carrier-to-interference (co-channel or adjacent-channel) (C/I) ratio is one of the most important radio network performance criteria in evaluating an analog cellular network 10, such as the AMPS network. In order to reduce interference within the cellular network 10, both co-channel and adjacent channel interference must be minimized. Therefore, by increasing the C/I ratio, e.g., by reducing the interference with respect to the carrier (level) of the desired signal, the co-channel or adjacent channel interference can be reduced and the signal quality received by MSs 20 within the cell 22 can be improved.

The speech quality in digital cellular systems 10, such as the Global System for Mobile (GSM) Communication network or the D-AMPS network, is measured via quantities such as frame erasure, which is the percentage of TDMA frames that cannot be perceived, and the bit error rate (BER), which is an estimate of the number of coded bits in error. In order to measure the BER, the encoded bits that are transmitted in each burst or frame of data across the downlink channel 30 or uplink channel 32 are received by a receiver (not shown) and decoded, using, for example, a convolutional decoding algorithm. The algorithm also estimates how many errors were induced by the channel. This estimate of the BER can be referred to as the raw BER. It should be understood that the number of errors estimated by the convolutional decoder is just an estimate of the actual BER. However, this estimate can be considered reliable to a certain degree, and since convolutional codes are usually the most efficient coding mechanisms employed, the BER can be considered as the best estimate of the deterioration in speech quality for digital cellular networks 10.

In order to ensure adequate speech quality for MS's 20, the assignment of a traffic channel 37 to an MS 20 involved in a call connection has traditionally been based upon the C/I or BER uplink measurements. Many different approaches to channel assignment have been proposed to date. For example, two commonly used channel assignment methods include the traditional fixed channel assignment (FCA) strategy, and the distributed minimum interference scheme. In the minimum interference scheme, the MS 20 is assigned the traffic channel 37 of the nearest BS 24 with the minimum uplink 32 interference.

Another type of channel assignment method is the multi-channel assignment (MCA) algorithm. In this approach, various C/I constraints are guaranteed to various subscriber services. As these services require different BER performance levels, different C/I values are used to meet these requirements. The cell 22 is typically divided into concentric zones and the C/I performance is traded-off according to the subscriber service requirements of each user.

A further type of channel assignment method is discussed in U.S. Pat. No. 4,794,635 to Hess. This method includes determining the channel 37 and sector activity and establishing a minimum quality factor for each active channel in order to establish an eligible channel 37 to which the requesting mobile subscriber will be assigned. The minimum quality factors attributable to such subscribers for each channel 37 are compared with respect to every other channel 37. The requesting mobile subscriber is assigned to a particular one of the possible eligible channels 37 which has a maximum of subscribers having the minimum quality factor.

In addition, in U.S. Pat. No. 5,212,831 to Chuang et al., a procedure is proposed that consists of signal strength measurements and an algorithm which selects the frequency with minimum interference from other ports. The frequency channel 37 with the lowest received power is tentatively assigned for downlink transmission by that port. All the ports repeat this procedure either independently or asynchronously or with a schedule.

The algorithms proposed in U.S. Pat. Nos. 4,794,635 and 5,212,831 disallow selection of channels 37 that have been disturbed by interference. As a first step, the C/I is calculated on the selected channel 37. The C/I is compared to the disturbed channel criteria to determine if the channel 37 is considered to be disturbed. A new channel 37 is re-selected if the channel 37 is considered disturbed.

However, in all of the above channel assignment methods, traffic channels 37 are either disallowed if they are considered disturbed or only chosen if they possess the minimum interference levels. In many cases, channels 37 that are considered disturbed may provide adequate speech quality for some MS's 20. In addition, if the channel 37 with the minimum C/I is always assigned, especially if there is congestion in the cell 22, one MS 20 may be assigned a channel 37 with a high C/I ratio that does not provide adequate speech quality to that MS 20, while another MS 20, which had previously been assigned a channel 37 with a lower C/I ratio, could have been assigned to the channel 37 with the higher C/I ratio and still experienced adequate speech quality. Thus, none of the above methods efficiently or effectively assign channels 37 to MS's 20 based upon the channel quality experienced by each individual MS 20.

It is, therefore, an object of the present invention to assign a channel to a mobile subscriber based upon both the interference level of the channel and the individual channel quality experienced by the mobile subscriber.

SUMMARY OF THE INVENTION

The present invention is directed to telecommunications systems and methods for assigning channels based upon interference and channel quality measurements. The interference level measurements are carried out on the uplink of the cellular network. Channels are categorized in accordance with interference bands depending upon the interference levels. Incoming service is pre-assigned to a channel in the highest available interference band and a channel quality measurement (CQM) is conducted. The service is either continued (assigned) on the same channel, reassigned to a channel with lower interference or dropped if no other channel with lower interference is available. Implementing this algorithm on all BS's results in assigning channels with high interference levels to MS's with high carrier levels and the channels with low interference levels to MS's with lower carrier levels. Advantageously, the channel reassignment algorithm of the present invention results in a uniform level of channel quality throughout the cellular network, which in turn yields higher capacity with adequate mobile power control.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
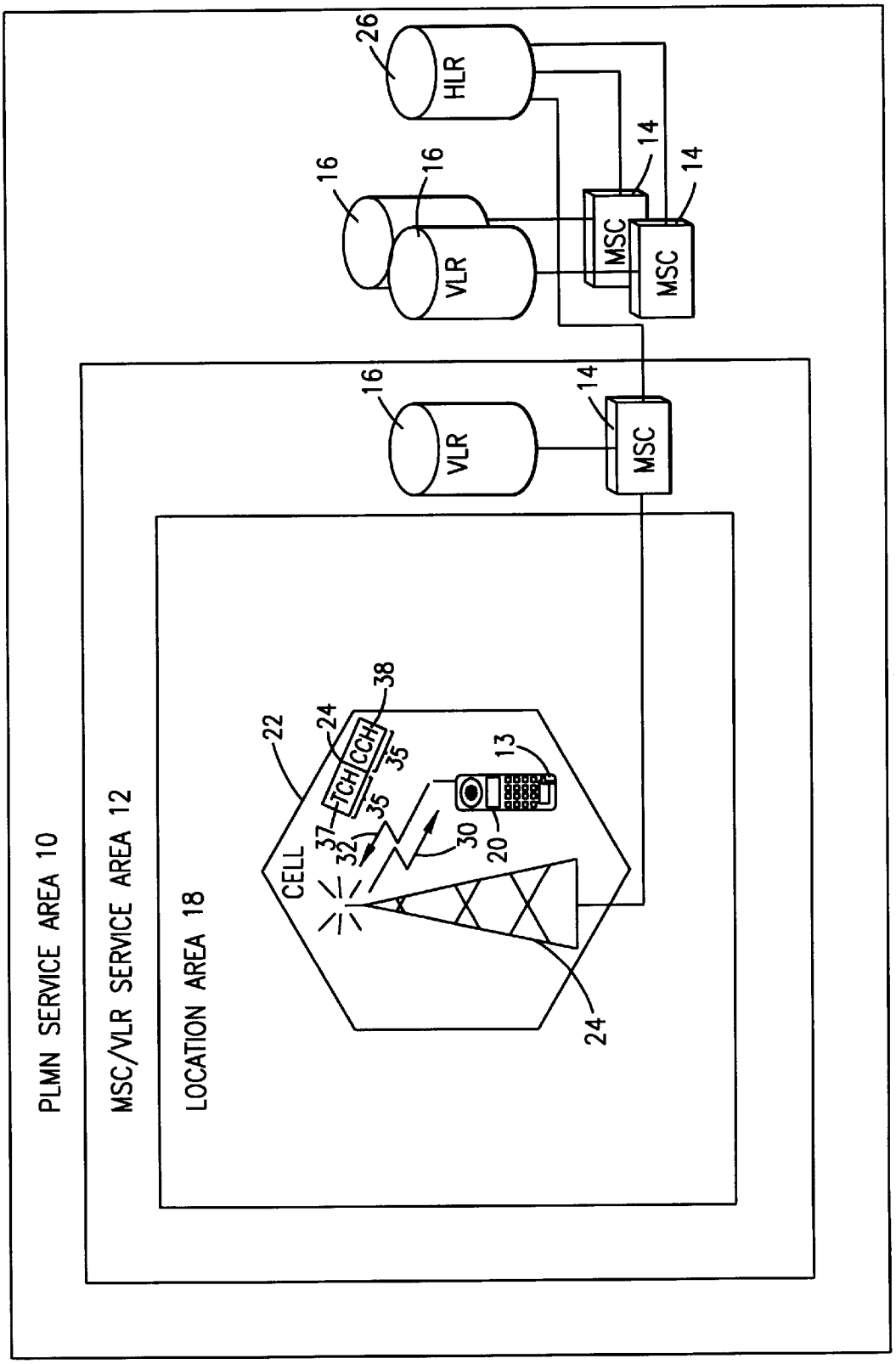
FIG. 1 is a block diagram of a conventional wireless telecommunications system.
Figure 2:
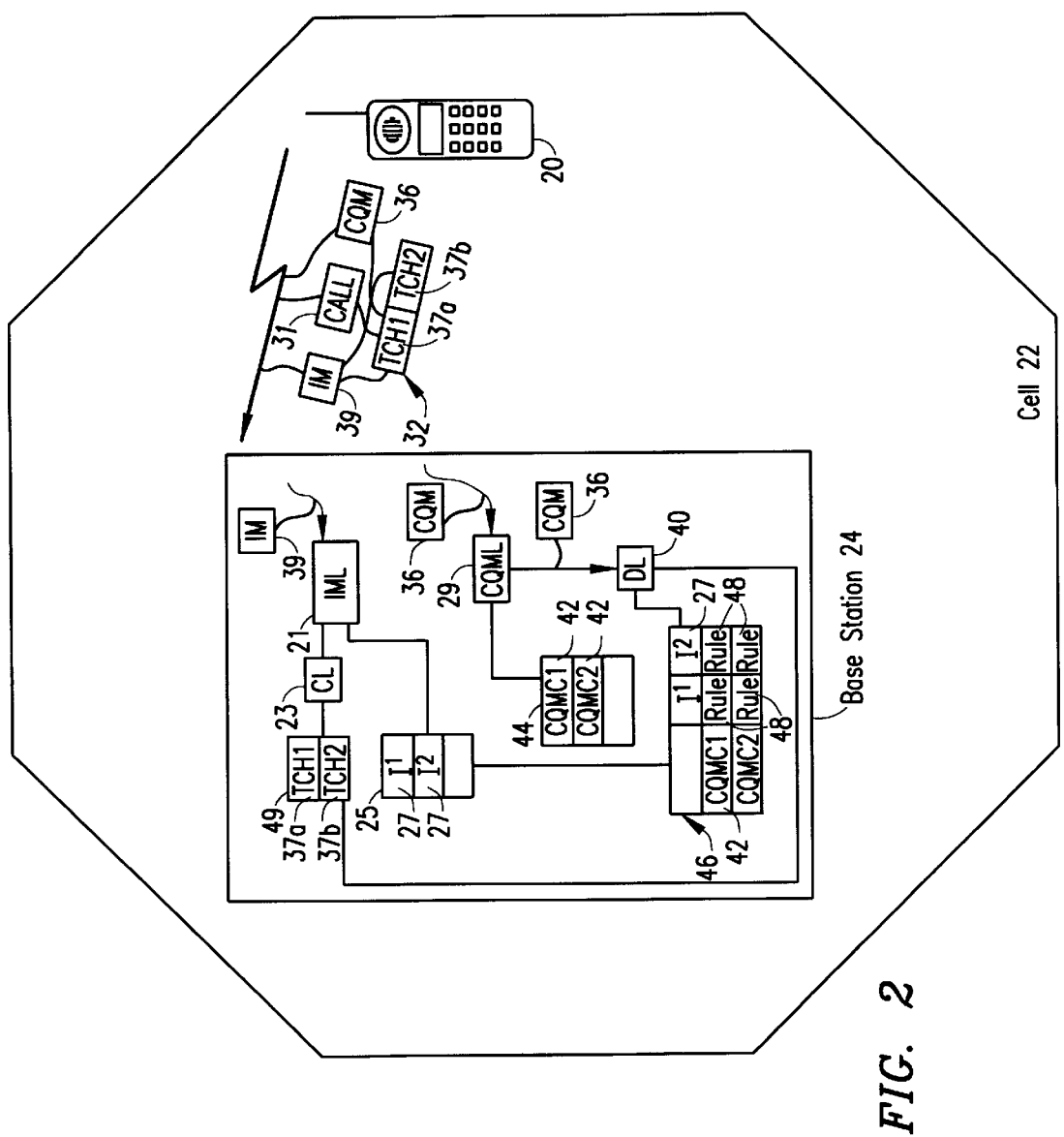
FIG. 2 is a block diagram illustrating a channel assignment and reassignment process based upon interference measurements and channel quality measurements in accordance with preferred embodiments of the present invention.

With reference now to FIG. 2 of the drawings, a channel assignment scheme based upon interference and channel quality measurements is shown in which the channel quality measurements utilize Carrier to Interference Ratio (C/I) for analog systems or Bit Error Rate (BER) measurements for digital systems. Interference measurements 39 are carried out by interference measurement logic 21 within each base station (BS) 24 within a cellular network 10, one of which is shown, on each channel 37 on the uplink 32 from Mobile Stations (MSs) 20 to the BS 24 serving cell 22.

The measured interference values 39 are divided into n thresholds specified as interference levels. It should be noted that the actual value of "n" depends upon the requirements of the cellular network 10. A larger value of "n" usually imposes a greater amount of processing requirements. Given "n" interference levels, $1_1, 1_2, \ldots 1_n$, there are "n+1" interference bands 27; $1^1, 1^2, \ldots, 1^{n+1}$, which can be stored in a database 25 within the BS 24, or Base Station Controller (BSC) for GSM systems. The mapping between the interference levels and the interference bands 27 is shown in Table 1 hereinbelow.

TABLE 1

| Condition | Interference Band |
|---|---|
| $1 > 1_n$ | $1^{n+1}$ (blocked interference band) |
| $1_{n-1} < 1 < 1_n$ | $1^n$ |
| ... | ... |
| $1_1 < 1 < 1_2$ | $1^2$ |
| $1 < 1_1$ | $1^1$ |

The highest interference band 27 is always blocked, which implies that $1_n$ is the "blocking threshold." The blocking threshold is set by the network operator. Categorization logic 23 within the BS 24 categorizes the remaining unused channels in accordance with Table 1. Thus, a list 49 of channels 37 is compiled and stored in the BS 24 that categorizes the channels 37 in accordance with the uplink 32 interference level 39.

Incoming service 31, e.g., when an MS 20 served by the BS 24 makes or receives a call, is pre-assigned to a channel 37a in the highest available interference band 27 that is not blocked. Thereafter, channel quality measurement logic 29 within the BS 24 conducts a channel quality measurement (CQM) 36 of the pre-assigned channel 37a to the MS 20. The potential channel qualities can be divided into n−x+2 categories 42, e.g., $Q^1, Q^2, \ldots, Q^{n-x+2}$, where "n" is the number of interference thresholds and "x" is a "reassignment step." The channel quality categories 42 can be stored in another database 44 within the BS 24. There is a correspondence between channel quality categories 42 and the channel quality measurements (CQM) 36, i.e., C/I for analog and BER measurements for digital. The channel quality categories 42 are shown in Table 2 hereinbelow.

TABLE 2

| Category | Analog | Digital |
|---|---|---|
| $Q^{n-x+2}$ | $C/I > (C/I)_{n-x+1}$ | $BER < BER_1$ |
| $Q^{n-x+1}$ | $(C/I)_{n-x} < C/I < (C/I)_{n-x+1}$ | $BER_2 > BER > BER_1$ |
| $Q^{n-x}$ | $(C/I)_{n-x-1} < C/I < (C/I)_{n-x}$ | $BER_3 > BER > BER_2$ |
| ... | ... | ... |
| $Q^2$ | $(C/I)_1 < C/I < (C/I)_2$ | $BER_{n-x-1} > BER > BER_{n-x}$ |
| $Q^1$ | $C/I < (C/I)_1$ | $BER > BER_{n-x+1}$ |

The range of values of the CQMs 36 (C/I or BER) corresponding to channel quality categories 42 is not arbitrary. It depends upon the relative distribution of the CQM 36. However, the actual assignment of these ranges is performed by the network operator.

The parameter "x" is the reassignment step and is dependent upon the algorithmic implementation. This parameter specifies the number of interference bands 27 that are skipped on channel reassignment. This parameter can range in values x=1−n−1. Typical values of the x are "1" or "2." A larger value of "x" implies lesser processing requirements while a smaller value implies greater requirements.

Depending upon the channel quality category 42, decision logic 40 within the BS 24 decides whether to keep the call 31 on the same channel 37a, reassign the call 31 to a channel 37b corresponding to a lower interference band 27 as per the reassignment step or drop or hand-off the call 31. The call 31 is dropped if a hand-off candidate on another system (not shown) is not available. The decision to maintain, reassign or drop made by the decision logic 40 is based upon a rule table 46 stored in the BS 24, such as the one shown in Table 3 hereinbelow.

TABLE 3

| Band/Category | $1^{n+1}$ | $1^n$ | $1^{n-1}$ | ... | $1^2$ | $1^1$ |
|---|---|---|---|---|---|---|
| $Q^{n-x+2}$ | Blocked | Continue | Continue | ... | Continue | Continue |
| $Q^{n-x+1}$ | Blocked | R. $\geq 1^{n-x}$ | Continue | ... | Continue | Continue |
| $Q^{n-x}$ | Blocked | R $\geq 1^{n-x-1}$ | R $\geq 1^{n-x-1}$ | ... | Continue | Continue |
| $Q^{n-x-1}$ | Blocked | R $\geq 1^{m-x-2}$ | R $\geq 1^{m-x-2}$ | ... | Continue | Continue |
| ... | Blocked | ... | ... | ... | ... | ... |
| $Q^2$ | Blocked | R $\geq 1^1$ | R $\geq 1^1$ | | R $\geq 1^1$ | Continue |
| $Q^1$ | Blocked | Drop | Drop | Drop | Drop | Drop |

The rule table 46 includes the channel quality categories 42, interference bands 27 and associated rules 48, in which each rule 48 corresponds to the intersection between one channel quality category 42 and one interference band 27. The rules 48 include the action "Blocked," which implies that such channels 37 are not utilized in the pre-assignment stage as they correspond to the blocked interference band $1^{n+1}$. The action "Continue" implies that call 31 is continued in the pre-assigned channel 37a. The action $R \geq 1^j$ implies that the call 31 should be reassigned to a channel 37b in the interference band $1^j$. Finally, the action "Drop" represents the worse possible channel quality category 42 in which the call 31 is dropped or handed-off to another system.

If the call 31 is reassigned to a channel 37b in a lower interference band 27, the interference level on the reassigned channel 37b is below the interference level on the preassigned channel 37a by a predetermined value. In other words, the channel quality increases by at least a predetermined value. Thus, the MS's 20 pre-assigned channels 37a with low quality are reassigned to channels 37b with lower interference level, i.e., effectively increasing the C/I. Therefore, implementing the reassignment system and method of the present invention on all BS's 24 within the cellular network 10 results in assigning the channels 37 with high interference levels to MS's 20 with high carrier levels and the channels 37 with low interference levels to MS's 20 with lower carrier levels. As a result, a uniform C/I can be obtained, which, in turn yields higher capacity with adequate mobile power control.

As an example, if n=4 and x=2, the interference bands 27 are specified by Table 4 hereinbelow, while the channel quality categories 42 are given by Table 5 hereinbelow.

TABLE 4

| Condition | Interference Band |
|---|---|
| $1 > 1_4$ | $1^5$ (blocked interference band) |
| $1_3 < 1 < 1_4$ | $1^4$ |
| $1_2 < 1 < 1_3$ | $1^3$ |
| $1_1 < 1 < 1_2$ | $1^2$ |
| $1 < 1_1$ | $1^1$ |

TABLE 5

| Category | Analog | Digital |
|---|---|---|
| $Q^4$ | $C/I > (C/I)_3$ | $BER < BER_1$ |
| $Q^3$ | $(C/I)_2 < C/I < (C/I)_3$ | $BER_2 > BER > BER_1$ |
| $Q^2$ | $(C/I)_2 < C/I < (C/I)_2$ | $BER_3 > BER > BER_2$ |
| $Q^1$ | $C/I < (C/I)_1$ | $BER > BER_3$ |

As shown in Table 5, there are three quality thresholds, $(C/I)_{1-3}$ or $BER_{1-3}$, which yields four channel quality categories 42. $Q^{1-4}$ where $Q^j$ j=4, corresponds to the acceptable quality for all interference levels. The quality deteriorates with decreasing j and $Q^1$ is the quality category 42 where the call is either handed-off or dropped. In other words, $BER_1 < BER_2 < BER_3$ and $(C/I)_1 > (C/I)_2 > (C/I)_3$.

Initially, all of the channels 37 on a BS 24 are discriminated into interference bands 27 based upon their interference levels. The channels 37 with interference greater than the $I_4$ are blocked. The remaining channels 37 are available for pre-assignment and reassignment.

Incoming service 31 is pre-assigned to channels 37a available in the interference bands 27 with the highest interference, which in this case is $I^4$. Following the channel quality measurements 36, the rules in Table 6 hereinbelow are applied.

TABLE 6

| Band/Category | $1^5$ | $1^4$ | $1^3$ | $1^2$ | $1^1$ |
|---|---|---|---|---|---|
| $Q^4$ | Blocked | Continue | Continue | Continue | Continue |
| $Q^3$ | Blocked | R. $\geq 1^2$ | Continue | Continue | Continue |
| $Q^2$ | Blocked | R $\geq 1^1$ | R $\geq 1^1$ | Continue | Continue |
| $Q^1$ | Blocked | Drop | Drop | Drop | Drop |

Figure 3:
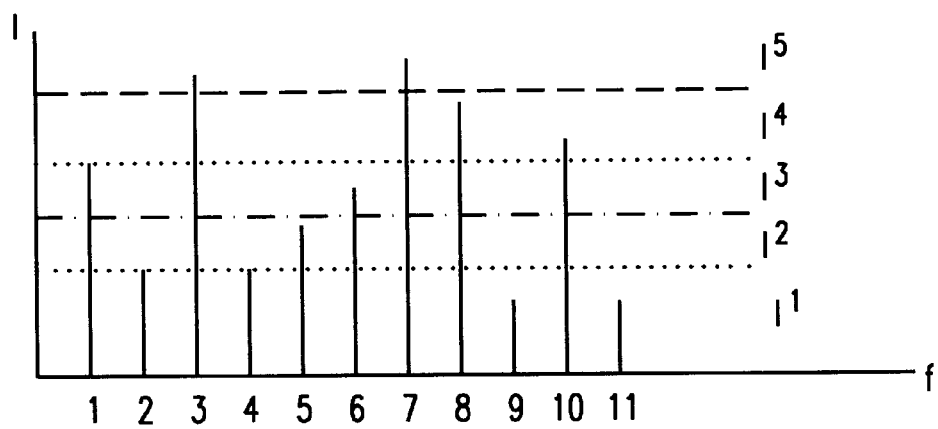
FIG. 3 illustrates sample interference measurement results using embodiments of the present invention.
Figure 4:
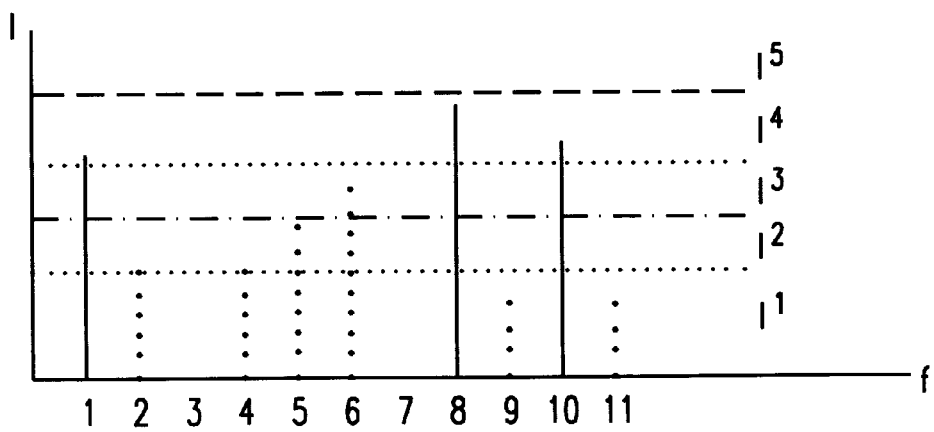
FIG. 4 illustrates sample channel discrimination based upon the sample interference measurement results shown in FIG. 3 of the drawings.

If, for example, there are eleven channels 37 associated with each BS 24, after interference measurements 39, the channels 37 are divided into bands 27, as shown in FIG. 3 of the drawings. As can be seen in FIG. 3, frequencies 7 and 3 are blocked and frequencies 1, 8 and 10 are designated for pre-assignment, while the remaining frequencies are potential reassignment candidates, as shown in FIG. 4 of the drawings.

Figure 5:
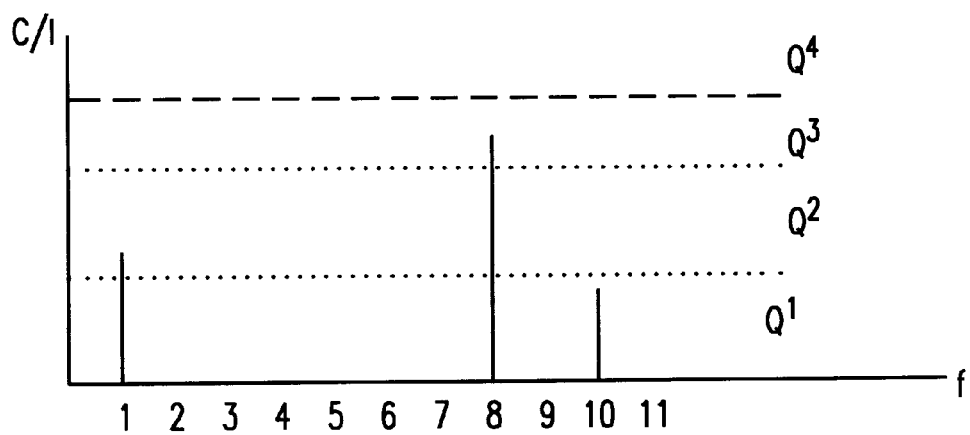
FIG. 5 illustrates sample channel quality measurements to be used along with the channel discrimination shown in FIG. 4 of the drawings to reassign channels based upon interference measurements and channel quality measurements in accordance with embodiments of the present invention.

If the cellular network 10 is an analog system, the channel quality measurement (CQM) 36 in this example is the C/I ratio. The BS 24 measures the C/I ratio of the pre-assigned channels 1, 8 and 10, as shown in FIG. 5 of the drawings. The reassignment then follows from the rules 48 listed in Table 6 above.

As can be seen in FIG. 5 of the drawings, the MS 20 on channel 1 has a CQM in the channel quality category $Q^2$, and therefore, it is reassigned a channel in $1^1$, such as channel 9. The MS 20 on channel 8 is reassigned a channel in $1^2$, such as channel 6. Finally, the MS 20 on channel 10 is dropped if it fails the handoff process.

Although the description hereinabove has been focused on voice channels 37, the channel reassignment system and method of the present invention can also be applied to data channels 37. In addition, embodiments of the present invention are applicable to both frequency division multiple access (FDMA) and time division multiple access (TDMA) wireless communication systems.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A base station within a cellular network for assigning channels to incoming service based upon interference measurements and channel quality measurements, comprising:

interference measurement logic for measuring interference values on each said channel assigned to said base station;

a first database for storing interference bands based upon said measured interference values;

channel quality measurement logic for measuring a channel quality value on a first channel associated with said base station and assigned to an incoming service, said first channel having an interference value associated therewith within a highest available one of said interference bands; and decision logic for determining whether to maintain said incoming service on said first channel, drop said incoming service or reassign said incoming service to a second channel associated with said base station having an interference value associated therewith within a lower one of said interference bands than said highest available interference band, said determination being based upon said channel quality value and said highest available interference band.

2. The base station of claim 1, wherein said interference values are carrier to interference ratios.

3. The base station of claim 1, wherein said interference values are bit error rates.

4. The base station of claim 1, wherein a highest one of said interference bands is blocked, said highest available interference band being below said highest interference band.

5. The base station of claim 1, further comprising:

categorization logic for categorizing each said channel in accordance with said respective interference values and said associated interference bands; and a list of said channels categorized using said categorization logic.

6. The base station of claim 1, further comprising:

a second database for storing channel quality categories, said channel quality value being within a select one of said channel quality categories, said decision logic making said determination based upon said select channel quality category.

7. The base station of claim 6, further comprising:

a third database for storing said channel quality categories, said interference bands and rules corresponding with each combination of each of said channel quality categories and each of said interference bands, said determination being a select one of said rules corresponding with said select channel quality category and said highest available interference band.

8. The base station of claim 1, wherein said interference values are measured on uplink channels associated with said base station.

9. The base station of claim 8, wherein said channel quality value is measured on a traffic channel one of said uplink channels associated with said base station.

10. A method for assigning channels to incoming service based upon interefrence measurements and channel quality measurements, comprising the steps of:

measuring interference values on each said channel assigned to a base station within a cellular network;

storing, within a first database within said base station, interference bands based upon said measured interference values;

measuring a channel quality value on a first channel associated with said base station and assigned to a incoming service, said first channel having an interference value associated therewith within a highest available one of said interference bands; and deciding whether to maintain said incoming service on said first channel, drop said incoming service or reassign said incoming service to a second channel associated with said base station having an interference value associated therewith within a lower one of said interference bands than said highest available interference band, based upon said channel quality value and said highest available interference band.

11. The method of claim 10, further comprising the step of:

blocking a highest one of said interference bands, said highest available interference band being below said highest intereference band.

12. The method of claim 10, further comprising the step of:

categorizing each said channel in accordance with said respective interference values and said associated interference bands.

13. The method of claim 10, further comprising the step of:

storing, within a second database within said base station, channel quality categories, said channel quality value being within a select one of said channel quality categories.

14. The method of claim 13, wherein said step of deciding is based upon said select channel quality category.

15. The method of claim 14, wherein said step of deciding further comprises the steps of:

storing, within a third database within said base station, said channel quality categories, said interference bands and rules corresponding with each combination of each of said channel quality categories and each of said interference bands; and deciding whether to maintain said incoming service on said first channel, drop said incoming service or re-assign said incoming service to said second channel based upon a select one of said rules corresponding with said select channel quality category and said highest available interference band.

16. The method of claim 10, wherein said step of measuring said interference values further comprises the step of:

measuring said interference values on uplink channels associated with said base station.

17. The method of claim 16, wherein said step of measuring said channel quality value further comprises the step of:

measuring said channel quality value on a traffic channel one of said uplink channels associated with said base station.

18. The method of claim 10, further comprising the steps of:

receiving said incoming service by said base station, said incoming service being a call connection; and assigning said incoming service, by said base station, to said first channel, said first channel being a traffic channel.

* * * * *